(12) United States Patent
Gossweiler et al.

(10) Patent No.: US 9,292,878 B1
(45) Date of Patent: *Mar. 22, 2016

(54) APPLICATION PROGRAMMING INTERFACE FOR AUDIO RECOMMENDATION, DISCOVERY, AND PRESENTATION WITHIN A SOCIAL NETWORK

(75) Inventors: Richard Gossweiler, Sunnyvale, CA (US); Douglas Eck, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 447 days.

This patent is subject to a terminal disclaimer.

(21) Appl. No.: 13/350,713

(22) Filed: Jan. 13, 2012

(51) Int. Cl.
  G06F 17/00 (2006.01)
  G06Q 50/00 (2012.01)
  G06F 17/30 (2006.01)
  H04L 29/08 (2006.01)

(52) U.S. Cl.
  CPC .......... *G06Q 50/01* (2013.01); *G06F 17/30743* (2013.01); *H04L 67/02* (2013.01)

(58) Field of Classification Search
  None
  See application file for complete search history.

(56) References Cited

U.S. PATENT DOCUMENTS

| 7,774,009 | B2 | 8/2010 | Choi |
| 8,572,169 | B2 | 10/2013 | Partovi et al. |
| 2002/0041692 | A1* | 4/2002 | Seto et al. ......... 381/86 |
| 2007/0169165 | A1 | 7/2007 | Crull et al. |
| 2008/0052371 | A1* | 2/2008 | Partovi et al. .......... 709/217 |
| 2009/0069911 | A1 | 3/2009 | Stefik |
| 2010/0150383 | A1 | 6/2010 | Sampat |
| 2013/0218942 | A1* | 8/2013 | Willis ............ H04L 67/02 709/201 |
| 2014/0032676 | A1 | 1/2014 | Partovi et al. |

OTHER PUBLICATIONS

"How to Post Playlists on Facebook", Jan. 6, 2010, retrieved from <http://www.playlist.com/siteblog/?p=337>.

* cited by examiner

*Primary Examiner* — Fan Tsang
*Assistant Examiner* — David Siegel
(74) *Attorney, Agent, or Firm* — McDermott Will & Emery LLP

(57) ABSTRACT

A system and method for providing an application programming interface for interfacing with audio files within a social networking service are provided. The method includes receiving, at the one or more computing devices, an ordered list of social networking contacts associated with a member of the social networking service. The ordered list of social networking contacts is arranged according to a ranking of the social networking contacts. The method also includes receiving a list of audio files associated with the member of the social networking service. The method also includes receiving a set of instructions. The set of instructions is configured to be implemented with the ordered list of social networking contacts and the list of audio files. The method also includes interfacing with the ordered list of social networking contacts or the list of audio files according to the set of instructions to modify the list of audio files.

28 Claims, 4 Drawing Sheets

APPLICATION PROGRAMMING INTERFACE FOR AUDIO RECOMMENDATION, DISCOVERY, AND PRESENTATION WITHIN A SOCIAL NETWORK

BACKGROUND

The subject disclosure generally relates to social audio recommendation and discovery, and, in particular, to an application programming interface for controlling the presentation of audio files within a social network.

Audio files are inherently social instruments. Many social events, for example, parties, dates, dinners, etc., are oftentimes coupled with a background audio interface, e.g., a radio program. However, an audio file interface is missing from many aspects of the Internet-based social networking experience. As the foregoing illustrates, an approach to adding audio files to the social networking experience may be desirable.

Furthermore, selecting new audio files which a listener may enjoy is often a difficult task. Presently, listeners either locate and select prospective audio files themselves or receive direct verbal or written recommendations from their social contacts. Locating and selecting prospective audio files by oneself requires much time and effort, and direct verbal or written recommendations from social contacts are rare, as such recommendations may require thought, time, or effort by the social contacts. As the foregoing illustrates, an approach to automatically recommending new audio files to a listener may be desirable.

SUMMARY

The disclosed subject matter relates to a method executed on one or more computing devices for providing an application programming interface for interfacing with audio files within a social networking service. The method includes receiving, at the one or more computing devices, an ordered list of social networking contacts associated with a member of the social networking service. The ordered list of social networking contacts is arranged according to a ranking of the social networking contacts. The method also includes receiving a list of audio files associated with the member of the social networking service. The method also includes receiving a set of instructions. The set of instructions is configured to be implemented with the ordered list of social networking contacts and the list of audio files. The method also includes interfacing with the ordered list of social networking contacts or the list of audio files according to the set of instructions to modify the list of audio files.

The disclosed subject matter also relates to a machine-readable medium for providing an application programming interface for interfacing with audio files within a social networking service. The machine-readable medium includes instructions stored therein, which when executed by one or more computing devices, cause the one or more computing devices to perform operations. The operations include receiving a list of social networking contacts associated with a member of the social networking service. The operations also include receiving an ordered list of audio files associated with the member of the social networking service. The ordered list of social networking contacts is arranged according to a ranking of the audio files associated with the member. The operations also include receiving a set of instructions. The set of instructions is configured to be implemented with the list of social networking contacts and the ordered list of audio files. The operations also include interfacing with the list of social networking contacts or the ordered list of audio files according to the set of instructions to modify the list of audio files.

The disclosed subject matter also relates to a system for providing an application programming interface for interfacing with audio files within a social networking service. The system includes one or more processors. The system also includes a memory including instructions stored therein, which when executed by the one or more processors, cause the one or more processors to perform operations. The operations include receiving a list of social networking contacts associated with a member of the social networking service. The operations also include receiving a list of audio files associated with the member of the social networking service. The operations also include receiving a set of instructions. The set of instructions is configured to be implemented with the list of social networking contacts and the list of audio files. The operations also include interfacing with the list of social networking contacts or the list of audio files according to the set of instructions to modify the list of audio files.

The disclosed subject matter also relates to a method executed on one or more computing devices for recommending audio files to a member of a social network. The method includes receiving, at the one or more computing devices, a representation of a first set of audio files associated with the member. The method also includes receiving a representation of a set of social networking contacts associated with the member. The method also includes receiving a representation of one or more second sets of audio files. Each second set of audio files is associated with at least one social networking contact in the set of social networking contacts associated with the member. The method also includes determining, using the one or more computing devices, a first set of characteristics based on the representation of the first set of audio files. The method also includes determining, using the one or more computing devices, a second set of characteristics based on the representation of the one or more second sets of audio files. The method also includes generating a recommendation for at least one new audio file based on the first set of characteristics and the second set of characteristics. The at least one new audio file is not in the first set of audio files. The method also includes providing an indication of the recommendation for the at least one new audio file.

The disclosed subject matter also relates to a machine-readable medium for providing an application programming interface for recommending audio files to a member of a social network. The machine-readable medium includes instructions stored therein, which when executed by one or more computing devices, cause the one or more computing devices to perform operations. The operations include receiving a representation of a first set of audio files associated with the member. The operations also include receiving a representation of a set of social networking contacts associated with the member. The operations also include receiving a representation of one or more second sets of audio files. Each second set of audio files is associated with at least one social networking contact in the set of social networking contacts associated with the member. The operations also include determining a first set of characteristics based on the representation of the first set of audio files. The operations also include determining a second set of characteristics based on the representation of the one or more second sets of audio files. The operations also include generating a recommendation for at least one new audio file based on the first set of characteristics and the second set of characteristics. The at least one new audio file is not in the first set of audio files. The at least one new audio file is not in the one or more second sets of audio files.

The disclosed subject matter also relates to a system for recommending audio files to a member of a social network. The system includes one or more processors. The system also includes a memory including instructions stored therein, which when executed by the one or more processors, cause the one or more processors to perform operations. The operations include receiving a representation of a first set of audio files associated with the member. The operations also include receiving a representation of an ordered list of social networking contacts associated with the member. The operations also include receiving a representation of one or more second sets of audio files. Each second set of audio files is associated with a social networking contact in the ordered list of social networking contacts associated with the member. The ordered list of social networking contacts is arranged according to a ranking of the social networking contacts. The operations also include determining a first set of characteristics based on the representation of the first set of audio files. The operations also include determining one or more second sets of characteristics based on the representation of the one or more second sets of audio files. The operations also include associating at least a portion of characteristics in the one or more seconds set of characteristics with a likelihood-of-interest. The likelihood-of-interest is based on a position of the associated social networking contact in the ordered list of social networking contacts. The operations also include generating a recommendation for at least one new audio file based on the first set of characteristics, the one or more second sets of characteristics, and the likelihood-of-interest associated with characteristics in the one or more second sets of characteristics. The at least one new audio file is not in the first set of audio files.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
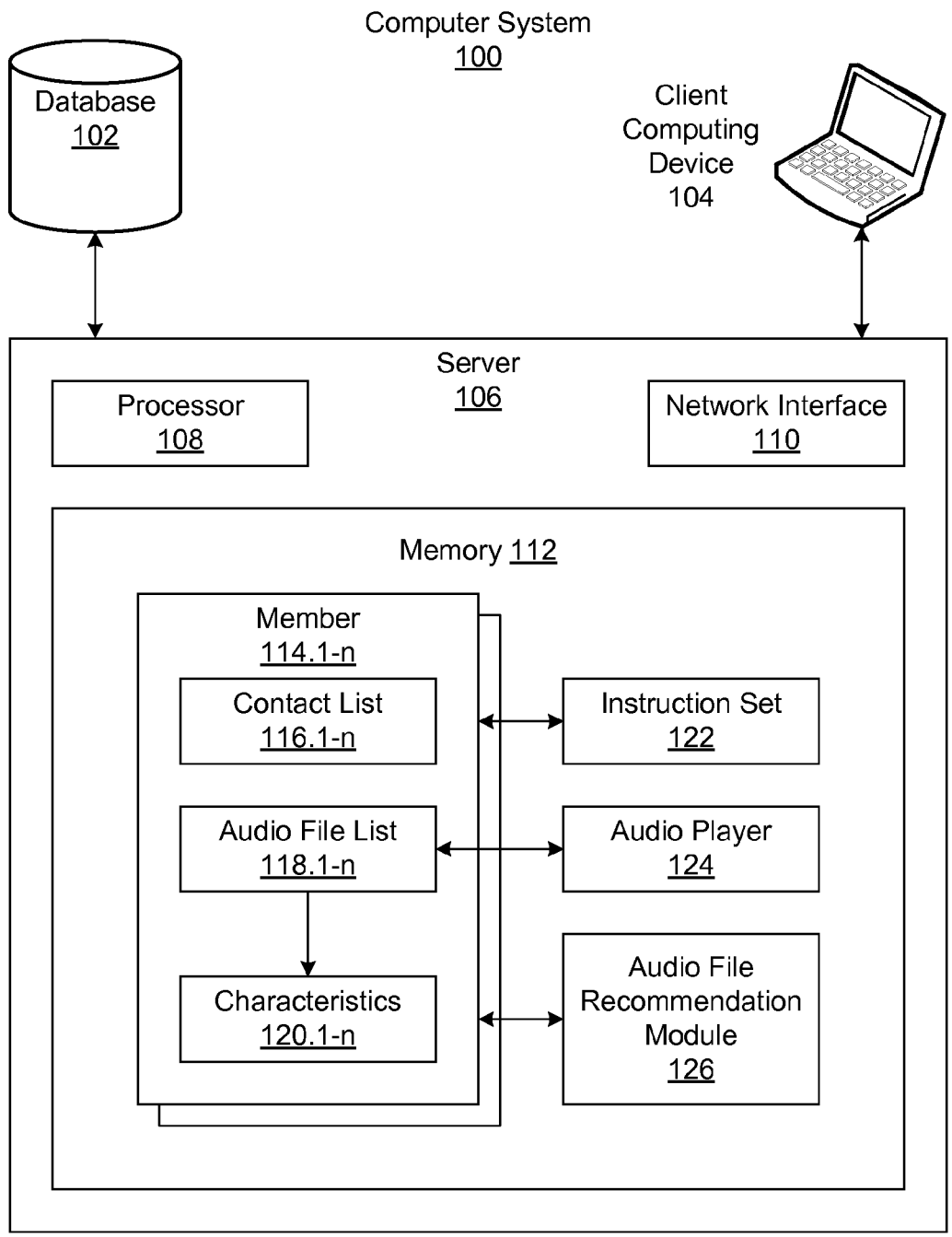
FIG. 1 illustrates an example of a computer system configured to provide an application programming interface for interfacing with audio files within a social network.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

I. Overview

The subject disclosure relates to techniques for providing an application programming interface for interfacing with audio files within a social networking service. A server may receive an ordered list of social networking contacts associated with a member of the social networking service. The ordered list of social networking contacts associated with the member may include the social circles of the member. The ordered list of social networking contacts may be arranged according to a ranking of the social networking contacts. The ranking of the social networking contacts may be based on closeness to the member or closeness in taste in audio files to the taste in audio files of the member. The server may receive a list of audio files associated with the member of the social networking service. The server may receive a set of instructions. The set of instructions may be written in a programming language, e.g., JavaScript. The set of instructions may be configured to be implemented with the ordered list of social networking contacts and the list of audio files. The set of instructions may include instructions for interfacing with the ordered list of social networking contacts or the list of audio files according to the set of instructions to modify the list of audio files or the list of social networking contacts, or to provide data associated with the list of audio files or the ordered list of social networking contacts.

The subject disclosure also relates to techniques for recommending audio files to a member of a social network. In one example, the set of instructions may include instructions for recommending audio files to the member of a social network. The server may receive a representation of a first set of audio files associated with the member. The server may also receive a representation of a set of social networking contacts associated with the member, e.g., a representation of the social circles of the member. The server may also receive a representation of one or more second sets of audio files. Each second set of audio files may associated with at least one social networking contact in the set of social networking contacts associated with the member. The server may determine a first set of characteristics based on the representation of the first set of audio files. The first set of characteristics may include characteristics of the audio files (e.g., topics discussed in the audio files) or personal characteristics of the speakers in the audio files (e.g., age range, gender, profession, language, political views, religion, accent, etc.). The server may also determine a second set of characteristics based on the representation of the one or more second sets of audio files. The server may generate a recommendation for at least one new audio file based on the first set of characteristics and the second set of characteristics. The at least one new audio file may not be in the first set of audio files. The server may provide an indication of the recommendation for the at least one new audio file.

The phrase "computing device" as used herein encompasses its plain and ordinary meaning, including, but not limited to any device including one or more processors and a memory. The one or more processors may be configured to access data stored in the memory or to execute instructions stored in the memory. The memory may include a physical memory or a virtual memory. Example computing devices include a server, a client device, a laptop computer, a desktop computer, a tablet computer, a mobile phone, a television including one or more processors and a memory embedded therein or coupled thereto, a physical machine, or a virtual machine.

The phrase "application programming interface" as used herein encompasses its plain and ordinary meaning, including, but not limited to any a source code based specification intended to be used as an interface by software components to communicate with each other. An application programming interface may, among other things, access data stored on a server and process the data, manipulate the data, modify the data, or provide an output based on the data.

The phrase "audio file" as used herein encompasses its plain and ordinary meaning, including, but not limited to a file including sound information. Audio files may include, for example, recordings of lectures, recordings of meetings, recordings of speeches, or podcasts. Audio files may be represented as, for example, MP3 files, WMA files, or WAV files.

Users or members of social networks or social networking services may create associations with one another. The phrase "social networking service" as used herein encompasses its plain and ordinary meaning, including, but not limited to, an online service, platform or site that focuses on building and reflecting of social associations and interactions among users. These associations may be stored within a social graph at each social networking site. Such user associations may be defined on a user-to-user basis, or as a group of users associated through membership within a group. As used herein, "contacts" refer to other users that a user is associated with, at one or more social networking sites.

A user may create "social groups" (e.g., social circles, lists or sets of social networking contacts) including one or more contacts to organize his/her associations. The social groups may be additionally used to control distribution of messages and content to contacts of the user. For example, "social circles" may be categories to which a user can assign their social networking contacts and better control the distribution and visibility of social networking messages as well as other multimedia content (e.g., documents, and other collaboration objects). In accordance with some embodiments, a social circle is provided as a data set defining a collection of contacts that may, for example, be associated with one another. As used herein, a social circle can be described from the perspective of an individual that is the center of a particular collection of socially interconnected people, or from the aggregate perspective of a collection of socially interconnected people. In some examples, a social circle can have narrowly defined boundaries, all of the members of the social circle may be familiar with one another, and permission may be required for a member to join a social circle. In accordance with the subject disclosure, a user of an electronic device may define a social circle, and the social circle, as a data set defining a collection of contacts, may reflect a real-life social circle of the user. In some embodiments, social circle may be asynchronous. For example, a first user may define a social circle of relatives that includes the accounts of her cousins and siblings. One of the siblings may not have defined such a circle, and may not even have the first user in any circle.

For example, a user of an electronic device may have different groups of friends, coworkers, and family, and there may be some overlap among those groups (e.g., a coworker who is also considered to be a friend, a family member who is also a coworker). Through the creation and use of social groups (e.g., social circles), the user can organize and categorize his/her contacts into various different groupings. A list or set of social networking contacts may include one or more social circles of a member or contacts having similar personal characteristics (e.g., an age range, a profession, a geographic location, a current or former educational institution attended, a current or former employer, a hobby, or an athletic endeavor) to the member. The personal characteristics may be entered by users of the social networking service upon registration with the social networking service or upon modification of their personal data.

The phrase "order" as used herein encompasses its plain and ordinary meaning, including, but not limited to a disposition of things (e.g., items, representations of electronic data, etc.) following one another. One example of an ordered list or an ordered set is a list or set of students in a class arranged alphabetically.

The phrase "ranking" as used herein encompasses its plain and ordinary meaning including, but not limited to a position in an order. For example, in the English letters, arranged in alphabetical order, the letter "A" has a first ranking and the letter "B" has a second ranking.

The phrase "instructions" as used herein encompasses its plain and ordinary meaning including, but not limited to directions or commands configured to be executed by a computing device. Instructions may be written in binary code, in assembly language, or in a higher level programming language, for example, JavaScript or C++.

The phrase "interfacing with" as used herein encompasses its plain and ordinary meaning including, but not limited to modifying, using in a calculation, or using to generate an output. A computer program may process data stored in a computer, for example, by modifying the data, making a calculation based on the data, or providing an output based on the data.

The phrase "input" as used herein encompasses its plain and ordinary meaning including, but not limited to data provided to a computer for processing. The input data may be manually entered by a user, received from another computer, or received from a local memory of the computer.

The phrase "output" as used herein encompasses its plain and ordinary meaning, but not limited to data provided by a computer after completing a processing step or a computer program. The output data may be provided to a user, e.g., via a visual display (e.g., a screen) or via an audio-out (e.g., one or more speakers), transmitted to another computer, or stored in the local memory of the computer.

The phrase "characteristics" as used herein encompasses its plain and ordinary meaning including, but not limited to a trait pertaining to, constituting, or indicating a character or quality of a subject. For example, a characteristic of an audio file may include a topic discussed in the audio file (e.g., politics, religion, etc.), a tone used in the audio file (e.g., happy, angry, etc.), or a personal characteristic of a speaker of the audio file.

The phrase "personal characteristic" as used herein encompasses its plain and ordinary meaning including, but not limited to a trait pertaining to, constituting, or indicating a character or quality of a person. Example personal characteristics may include one or more of an age range, a profession, a geographic location, a current or former educational institution attended, a current or former employer, a hobby, or an athletic endeavor.

The phrase "representation" as used herein encompasses its plain and ordinary meaning including, but not limited to an expression or designation by a unit of electronic data. For example, a representation of an audio file may include, for example, a pointer or link to the audio file, an image associated with the audio file, a string including the title or filename of the audio file, the audio file itself, etc.

The phrase "indication" as used herein encompasses its plain and ordinary meaning including, but not limited to anything serving to indicate or point out the object of the indication. For example, an indication of an audio file may include, for example, a pointer or link to the audio file, an image associated with the audio file, a string including the title or filename of the audio file, the audio file itself, etc.

II. Example Computer System for Providing an Application Programming Interface for Interfacing with Audio Files Within a Social Network FIG. 1 illustrates an example of a computer system 100 configured to provide an application programming interface for interfacing with audio files within a social network.

As shown, the computer system 100 includes a database 102, a client computing device 104, and a server 106. The database 102, client computing device 104, and server 106 may communicate with one another via a network, e.g., the Internet or a cellular network, or via a direct wired or wireless connection. While only of each of the database 102, client computing device 104, and server 106 are illustrated, the subject technology may be implemented with one or more databases 102, client computing devices 104, and servers 106. Furthermore, while three separate machines for each of the database 102, client computing device 104, and server 106 are illustrated, a single machine may implement the functions of two or more of the database 102, client computing device 104, and server 106.

The database 102 may be associated with one or more of a social networking database, an audio file database, or a database for information related to audio files. The database 102 may store audio files or information related to audio files, e.g., images associated with audio files. The audio files may include, for example, recordings of lectures, recordings of meetings, recordings of speeches, or podcasts. The database 102 may also store information related to a social network, for example, a set of members in a social network, a set of social contacts (e.g., a contact list) associated with each member, or a set of audio files (e.g., an audio file list) associated with each member. The set of social contacts may include a social network group, e.g., a social circle.

The client computing device 104 may be any computing device capable of interacting with a user, for example, by providing a social networking application, or an audio file player/interface application to the user. One or more of the social networking application or the audio file player/interface application may be implemented via a general purpose application, e.g., a web browser, or via a specialized application. The client computing device 104 may be a laptop computer, a desktop computer, a mobile phone, a personal digital assistant (PDA), a tablet computer, a netbook, a television with one or more processors embedded therein or coupled thereto, a physical machine, or a virtual machine, for example. The client computing device 104 may include one or more of a keyboard, a mouse, a display, or a touch screen. Other devices could implement the functionalities of the client computing device 104 and other components may be included in the client computing device 104.

The server 106 may be implemented as a single machine with a single processor, a single machine with multiple processors, or multiple machines with multiple processors. As shown, the server 106 includes a processor 108, a network interface 110, and a memory 112. The processor 108 is configured to execute computer instructions that are stored in a machine-readable medium, for example, the memory 112. The processor 108 may be a central processing unit (CPU). The network interface 110 is configured to allow the server 106 to transmit and receive data in a network. The network interface 110 may include one or more network interface cards (NICs). The memory 112 may store data and instructions, which may be accessed or executed by the processor 108. As shown, the memory includes data structures representing one or more members 114.1-n of a social network, an instruction set 122, instructions associated with an audio player 124, and an audio file recommendation module 126.

Each of the data structures representing one or more members 114.1-n may be associated with a member or a user of a social network. A member of a social network may be a person, a business, an organization, or a product, e.g., a movie. The data structure associated with a member 114.k may include a set of characteristics of the member (e.g., the member's hobbies, religion, geographic location, current or former employers, current or former educational institutions attended, etc.). The data structure associated with the member 114.k may also include data posted or uploaded to the social network by the member, e.g., images, videos, audio files, comments, or articles, or data posted or uploaded by other members that mention the member or are shared with the member.

Each member 114.k may be associated with a contact list 116.k. The contact list 116.k may include one or more social contacts of the member 114.k. The contact list 116.k may include one or more social circles of the member 114.k. The contact list 116.k may include one or more members of the social network having at least one personal characteristic common to that of the member 114.k. Example personal characteristics may include one or more of an age range, a profession, a geographic location, a current or former educational institution attended, a current or former employer, a hobby, or an athletic endeavor. The contact list 116.k may be an ordered list of social contacts, where each social contact has a ranking in the list, or an unordered list of social contacts, where at least one social contact lacks a ranking in the list. The ranking of the ordered list may be based on, for example, a ranking of one or more of the closeness of the social contacts to the member 114.k, a closeness of a taste in audio files of the social contacts to a taste in audio files of the member 114.k, a closeness of audio listening habits (e.g., listens in the morning, listens while driving, etc.) of the social networking contacts to audio listening habits of the member 114.k, or an alphabetical position of names of the social networking contacts. The closeness of a social networking contact in the contact list 116.k to the member 114.k may be measured, for example, based on interactions, e.g., chat sessions, posts, etc., within the social networking service. The similarity of the social networking contact 116.k to the member 114.k may be measured based on personal characteristics of the social networking contacts in the contact list 116.k common to those of to the member 114.k. The closeness of the taste in audio files may be measured by comparing the audio file list 118.k of the member 114.k with an audio file list of the social networking contact.

In one example, the server 106 may initially receive (e.g., from the database 102 or the client computing device 104) an unordered contact list 116.k. The server 106 may order the contact list 116.k according to a ranking of the social networking contacts in the contact list 116.k. The ranking may be based on a closeness or a similarity of the social networking contacts in the contact list 116.k to the member 114.k, a closeness or a similarity of a taste in audio files of the social networking contacts in the contact list 116.k to a taste in audio files of the member 114.k, or a closeness or a similarity of audio listening habits of the social networking contacts in the contact list 116.*k* to audio listening habits of the member 114.*k*.

Each member 114.*k* may also be associated with an audio file list 118.*k*. The audio file list 118.*k* may include one or more audio files associated with the member. The audio files in the audio file list 118.*k* may include one or more of recordings of lectures, recordings of meetings, recordings of speeches, podcasts, or other audio files. The audio files in the audio file list of a member may be owned by the member or licensed by the member. A member may have a license to listen to audio files in a shared directory of audio files, where the member has permission to play audio files in the shared directory but not to modify audio files in the shared directory. Each audio file may be associated with a time or an activity during which the member may listen to the audio file. Example times or activities include morning time, evening time, exercising, driving, or working. The audio file list 118.*k* may be an ordered list of audio files, where each audio file has a ranking in the list, or an unordered list of audio files, where at least one audio file lacks a ranking in the list. In one implementation, the server may receive (e.g., from the database 102 or client computing device 104) an unordered audio file list 118.*k* and order the audio file list 118.*k* based on a ranking. The ranking of the ordered list of audio files may be based on, for example, one or more of a preference for the audio files entered by the member 114.*k*, one or more characteristics (e.g., politics, President Obama, religion, Catholicism, economics, technology, male speaker, female speaker, baby boomer speaker, senior citizen speaker, speaker with British accent, etc.) associated with the audio files in the audio file list 118.*k*, or an alphabetical position of text metadata of the audio files. The text metadata of an audio file may include one or more of a title of the audio file, a title of a playlist associated with the audio file, or a name of a speaker in the audio file.

An audio file list 118.*k* associated with a member 114.*k* may correspond to an characteristics set 120.*k*. The characteristics set 120.*k* may include characteristics (e.g., politics, President Obama, religion, Catholicism, economics, technology, etc.) associated with the audio files in the audio file list 118.*k*. An characteristic corresponding to an audio file may be discussed in the audio file. For example, a podcast that discusses technology and economics may be associated with the characteristics "technology" and "economics." The characteristics set 120.*k* may correspond to an indication of frequency with which the characteristics in the characteristics set 120.*k* appear in the audio file list 118.*k*. For example, if an audio file list 118.*k* includes ten audio files with nine audio files concerning politics and on audio file concerning religion, the characteristic "politics" may be associated with a higher frequency than the characteristic "religion" in the corresponding characteristics set 120.*k*. At least one characteristic in the characteristics set 120.*k* may be associated with a likelihood-of-interest value by the entity corresponding to the member 114.*k*. In the above example, "politics" may have a high likelihood-of-interest for the member 114.*k* because the member 114.*k* has a relatively large number of audio files concerning "politics." Another characteristic, e.g., "travel," may have a low likelihood-of-interest for the member 114.*k* because the member 114.*k* does not have any audio files related to travel.

As illustrated, the memory 112 of the server 106 also includes an instruction set 122. The instruction set may include instructions configured to be implemented with the contact list 116.*k* and the audio file list 118.*k* of a member 114.*k*. The instruction set 122 may include instructions for interfacing with the contact list 116.*k* or audio file list 118.*k* of the member 114.*k* to generate an output. The output may include an audio or visual representation of all or a portion of the audio file list 118.*k* or the contact list 116.*k*, a modification of the audio file list 118.*k*, or a modification of the contact list 116.*k*. The server 106 may be configured to interact with the contact list 116.*k* and the audio file list 118.*k* of the member 114.*k* according to the instruction set 122. The instruction set 122 may be written in conjunction with an application programming interface (API) for interfacing with members 114.1-*n*, contact lists 116.1-*n*, and audio file lists 118.1-*n*. In one example, the instructions may be provided by a programmer and implemented in conjunction with the API. The instructions may also be written in a programming language, for example, JavaScript, Java, C, or C++.

The instruction set 122 may include one or more of instructions to provide a representation of the list of audio files within a graphical component, where the graphical component includes a circle or an ellipse, instructions to remove an audio file from the audio file list 118.*k*, instructions to add an audio file to the audio file list 118.*k* at a specified position in the audio file list 118.*k*, instructions to create a new list of audio files associated with the member 114.*k*, instructions to play an initial audio file in the audio file list 118.*k*, instructions to play the initial audio file in the audio file list 118.*k* at an increased or decreased playback speed, instructions to play backwards the initial audio file in the audio file list 118.*k* at an increased or decreased playback speed, instructions to skip the initial audio file in the audio file list 118.*k*, or instructions to adjust a quality or a volume of the playback of the audio files. The instruction set 122 may also include one or more of instructions to provide a subset of the social networking contact list 116.*k* including contacts listening to a specified audio file, instructions to provide a subset of the social networking contact list 116.*k* including contacts recommending a specified audio file, instructions to provide a subset of the social networking contact list 116.*k* including contacts recommending a specified collection of audio files, or instructions to provide a subset of the social networking contact list 116.*k* including contacts recommending the list of audio files. The instruction set 122 may also include one or more of instructions to associate each audio file in a subset of the audio file list 118.*k* with a characteristic, instructions to create a new list of audio files based on audio files in the audio file list 118.*k* that are associated with a specific characteristic, instructions to determine a taste for the specific characteristic of the member 114.*k* of the social networking service based on audio files in the audio files list 118.*k* that are associated with the specific characteristic, instructions to suggest new audio files to add to the audio file list 118.*k* based on the specified characteristic, instructions to suggest new audio files to add to the audio file list 118.*k* based on the specified characteristic and the ordered list of social networking contacts, or instructions to add suggested audio files to the audio file list 118.*k*. Other instructions may also be included in the instruction set 122.

All or a portion of the instructions in the instruction set 122 may be associated with an audio player 124. Specifically, the instructions in the instruction set 122 that involve interfacing with an audio file list 118.*k* may be associated with the audio player 124. The audio player may be configured to play audio files, e.g., via a client computing device (e.g., client computing device 104) including an audio output (e.g., a speaker). The audio player 124 may be configured to present a graphical user interface on a the client computing device. The graphical user interface associated with the audio player 124 may be chromeless, meaning that the graphical user interface may lack control buttons (e.g., a play button, a pause button, a rewind button, a fast forward button, etc.). Alternatively, the graphical user interface associated with the audio player 124 may include a play button or a pause button configured to be operated by a user of the client computing device. The graphical user interface associated with the audio player 124 may also include a rewind button or a fast forward button.

As shown, the memory 112 of the server 106 also includes an audio file recommendation module 126. In one implementation, the audio file recommendation module 126 may be included within the instruction set 122. Alternatively, the audio file recommendation module 126 may be a separate and distinct module from the instruction set 122. The audio file recommendation module 126 may include instructions for receiving a representation of a first set of audio files (e.g., audio file list 118.$k$) associated with the member (e.g., member 114.$k$). The audio file recommendation module 126 may also include instructions for receiving a set of social networking contacts (e.g., contact list 116.$k$) associated with the member. The audio file recommendation module 126 may also include instructions for receiving a representation of one or more second sets of audio files, wherein each second set of audio files is associated with at least one social networking contact in the set of social networking contacts associated with the member (e.g., if member 114.$k$ has a social networking contact, e.g., member 114.$j$, the audio file list 118.$j$ associated with member 114.$j$ may be included in the second set of audio files). The audio file recommendation module 126 may also include instructions for determining a first set of characteristics (e.g., characteristics set 120.$k$) based on the representation of the first set of audio files (e.g., audio file list 118.$k$). The audio file recommendation module 126 may also include instructions for determining a second set of characteristics (e.g. characteristics set 120.$j$) based on the representation of the one or more second sets of audio files (e.g., audio file list 118.$j$). The audio file recommendation module 126 may also include instructions for generating a recommendation for at least one new audio file based on the first set of characteristics and the second set of characteristics, wherein the at least one new audio file is not in the first set of audio files. The audio file recommendation module 126 may include instructions for providing an indication of the recommendation for the at least one new audio file. The indication of the recommendation for the at least one new audio file may include text or an image associated with the at least one new audio file.

Figure 2:
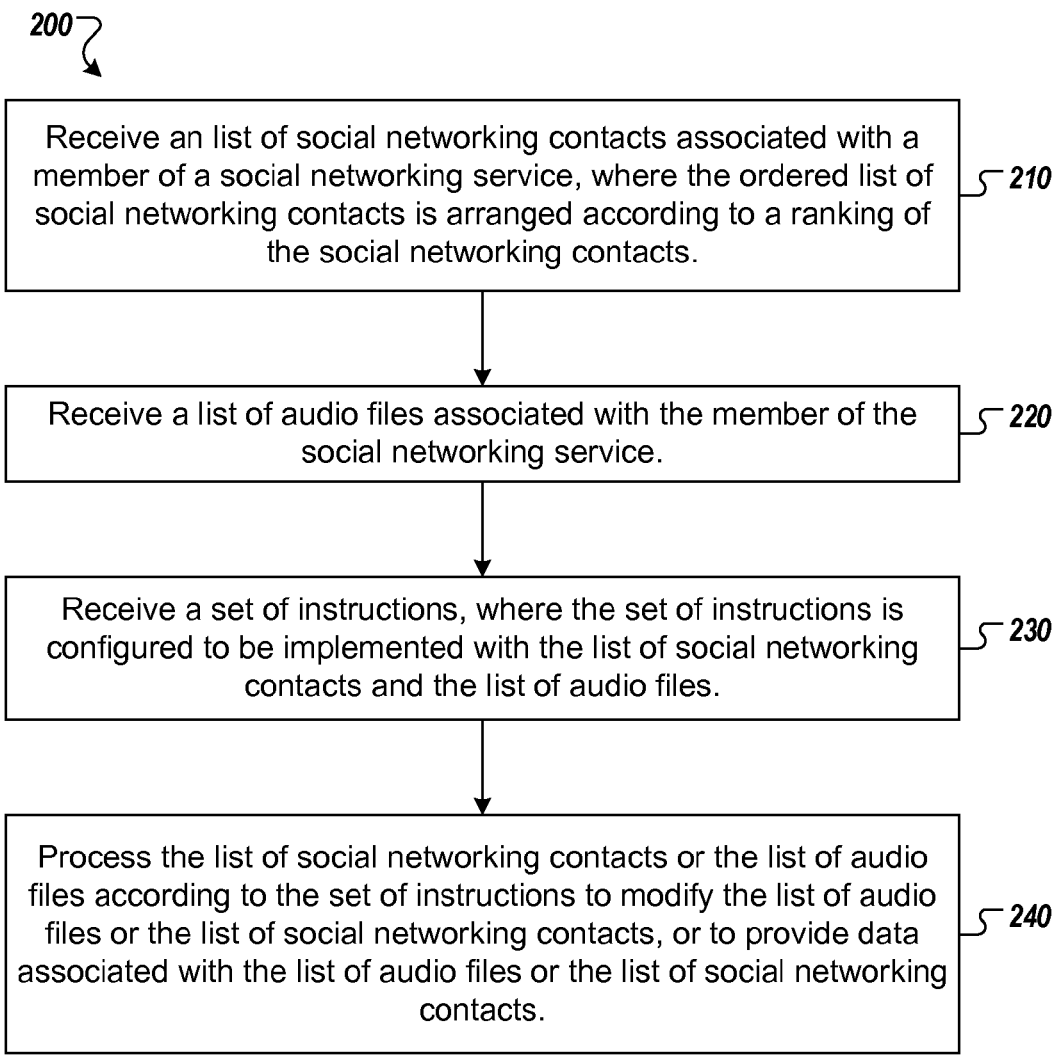
FIG. 2 illustrates an example process by which an application programming interface for interfacing with audio files within a social network may be provided.

III. Example Process for Providing an Application Programming Interface for Interfacing with Audio Files Within a Social Network FIG. 2 illustrates an example process 200 by which an application programming interface for interfacing with audio files within a social network may be provided.

The process 200 begins at block 210, where the server receives a list of social networking contacts associated with a member of a social networking service. The list may be an ordered list arranged according to a ranking of the social networking contacts. Alternatively, the list may be unordered. The server may order the list according to a ranking of the social networking contacts after receiving the list. The ranking of the list of social networking contacts associated with the member may be based on closeness or similarity to the member. The closeness of a social networking contact to the member may be measured based on interactions (e.g., chat sessions, messages, posts to feeds, in-person meetings, etc.) between the member and the social networking contact. The similarity of a social networking contact to a member may be determined based on the personal characteristics (e.g., age range, religion, geographic location, hobbies, current or former educational institution attended, current or former employer, etc.) of the social networking contact and the personal characteristics of the member.

In block 220, the server receives a list of audio files associated with the member of the social networking service. The list of audio files may include, for example, recordings of lectures, recordings of meetings, recordings of speeches, or podcasts. The list of audio files may include only metadata (e.g., title, speaker, date, etc.) about the audio files, and may or may not include the audio files themselves. The list of audio files may be an ordered list of audio files based on a ranking. The ranking may be based on a preference for the audio files of the member, which may be determined automatically based on the listening habits of the member or entered by the member, characteristics of the audio files (e.g., travel, technology, male speaker, female speaker, African American speaker, speaker with French accent, etc.), or an alphabetical position of text metadata (e.g., title) of the audio files. In one example, the server may receive an unordered list of audio files and the server may automatically order the list of audio files based on a ranking.

In block 230, the server receives a set of instructions. The set of instructions may be configured to be implemented with the list of social networking contacts and the list of audio files. For example, the instructions may include software code for providing an audio or visual output associated with the list of social networking contacts or the list of audio files. The instructions may include software code for modifying the list of social networking contacts or the list of audio files.

In block 240, the server processes the list of social networking contacts or the list of audio files according to the set of instructions to modify the list of audio files or the list of social networking contacts, or to provide data associated with the list of audio files or the list of social networking contacts. The server may process both the list of social networking contacts and the list of audio files simultaneously. Alternatively, the server may process one of the list of audio files or the list of social networking contacts. The data that is provided may be specified within the set of instructions. For example, the data that is provided may include an audio or visual representation of the list of audio files or the list of social networking contacts or a modification of the list of social network contacts or the list of audio files. After block 240, the process 200 ends.

In one example, after block 240, an image or text associated with one or more audio files may be provided for display. Alternatively, one or more of the audio files may be provided for playing or added to a playlist including audio files to be played. The text, images, or audio data may be displayed or played via a client computing device (e.g., client computing device 104).

Figure 3:
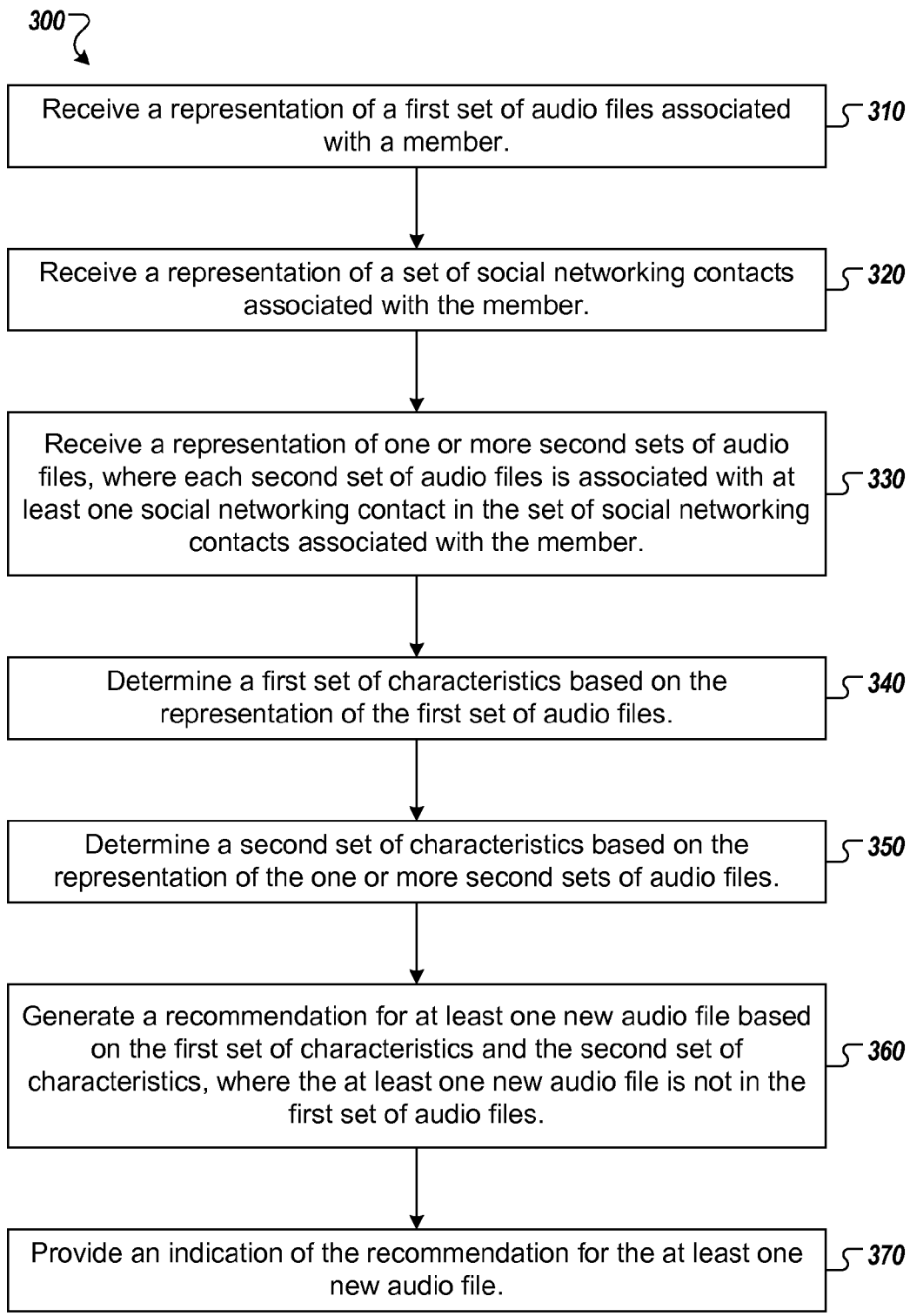
FIG. 3 illustrates an example process by which a new audio file may be recommended to a member of a social network.

IV. Example Process for Recommending a New Audio File to a Member of a Social Network FIG. 3 illustrates an example process 300 by which a new audio file may be recommended to a member of a social network. In one implementation, the process may be implemented via instructions provided to the server according to the process 200 of FIG. 2. Alternatively, the process may be implemented via instructions provided according to any other known process for providing or storing instructions.

The process 300 begins at block 310, the server receives a representation of a first set of audio files associated with a member of a social network (e.g., audio file list 118.$k$ of member 114.$k$). The audio files may include, for example, recordings of lectures, recordings of meetings, recordings of speeches, or podcasts. The first set of audio files may not be ordered. Alternatively, the first set of audio files may be ordered based on an interest level in the audio files by the member or based on an alphabetical order of text metadata (e.g., title or speaker name) of the audio files in the first set of audio files. The interest level of the member may be entered as input by the member or determined based on listening habits of the member. (E.g., a member may be more interested in audio files to which he/she listens frequently than in audio files to which he/she listens rarely.) In one example, the server may receive an unordered set of audio files associated with the member. The server may order the audio files automatically according to on any order described herein.

In block 320, the server receives a set of social networking contacts associated with the member (e.g., contact list 116.*k* of member 114.*k*). The set of social networking contacts associated with the member may include one or more social circles associated with the member. The set of social networking contacts associated with the member may include users of the social network having at least one personal characteristic common to the member. Example personal characteristics may include one or more of an age range, a profession, a geographic location, a current or former educational institution attended, a current or former employer, a hobby, or an athletic endeavor.

The set of social networking contacts may not be ordered. Alternatively, the set of social networking contacts may be ordered. The order of the set of social networking contacts may be based on the closeness of the social networking contacts to the member. The closeness can be entered as input by the member or determined automatically based on interactions between the member and the social networking contacts. Interactions may include chat sessions, messages, posts to feeds, views of profiles, in-person interactions, common calendar events, etc. The order of the set of social networking contacts may be based on a closeness of a taste in audio files of the social networking contacts to a taste in audio files of the member. The closeness of the taste in audio files may be entered by the member or the social networking contact. Alternatively, the closeness of the taste in audio files may be determined automatically based on the sets of audio files associated with the member or the social networking contact. The order of the set of social networking contacts may be based on a closeness of audio listening habits of the social networking contacts to the audio listening habits of the member. Example audio listening habits include listens in the morning, listens while driving, etc. The closeness of the taste in audio listening habits may be entered by the member or the social networking contact. Alternatively, the taste in audio listening habits may be determined automatically by tracking the time when the members and the contacts listen to audio files and the activities in which they are engaged. However, a user of the social networking service may opt-out of having his/her habits or activities tracked. In some embodiments, the user may not have his/her habits or activities tracked unless he/she specifically opts-into such data collection.

In block 330, the server receives a representation of one or more second sets of audio files. Each second set of audio files may be associated with at least one social networking contact in the set of social networking contacts associated with the member. For example, a second set of audio files may include an audio file collection of an entity in a social circle of the member. (E.g., if member 114.*j* is within the contact list 116.*k* of member 114.*k*, audio file list 118.*j* of member 114.*j* may be included in second set of audio files.)

In block 340, the server determines a first set of characteristics based on the representation of the first set of audio files. Characteristics in the first set of characteristics may include characteristics of audio files in the first set of audio files. For example, the characteristics may include topics discussed within an audio file or personal characteristics of a speaker in the audio file. Example characteristics may include politics, President Obama, religion, Catholicism, economics, technology, travel, Mexico, restaurants, male speaker, female speaker, baby boomer speaker, senior citizen speaker, speaker with British accent, speaker with foreign accent, single speaker, multiple speakers, Democrat speaker, Republican speaker, Green Party speaker, etc.

In block 350, the server determines a second set of characteristics based on the representation of the one or more second sets of audio files. Characteristics in the second set of characteristics may include characteristics of audio files in the second set of audio files. In one example, the server may determine a single second set of characteristics. Alternatively, the server may determine multiple second sets of characteristics, where each of the multiple second sets of characteristics is associated with a social networking contact of the member.

At least one characteristic in the first set of characteristics or the second set of characteristics may be associated with a likelihood-of-interest by the member. For example, if a set of audio files of the member includes multiple audio files having the characteristics "Canada" and "German accent," sets of audio files of the social contacts of the member also include multiple audio files having the characteristic "Canada" and "German accent," the member may be assigned a high likelihood-of-interest for the characteristics "Canada" and "German accent." In addition, if the sets of audio files of the member and the social contacts of the member contain few audio files having the characteristic "technology," the member may be assigned a low likelihood-of-interest for the characteristic "technology." In one example, the first set of characteristics or the second set of characteristics may include an order of characteristics. The order may be based on the likelihood-of-interest in the characteristics by the member.

In block 360, the server generates a recommendation for at least one new audio file based on the first set of characteristics and the second set of characteristics. The recommendation for the new audio file(s) may also be based on the likelihood of interest associated with a characteristic in the first set of characteristics or the second set of characteristics. The new audio file(s) may not be in the first set of audio files. The new audio file may be included in one of the second sets of audio files. Alternatively, the new audio file may not be included in each and every one of the second sets of audio files. The recommendation may include a suggestion that the user add the new audio file(s) to the first set of audio files, e.g., by purchasing a license to the audio files or downloading the audio files.

In one implementation, the recommendation for at least one new audio file may include an ordered list of multiple new audio files. The order of the ordered list of multiple new audio files may be based on the likelihood-of-interest of the member in the characteristics of the new audio files.

In block 370, the server provides an indication of the recommendation for the new audio file(s). The indication of the recommendation may include visual data or audio data and may be presented to a user via a client computing device connected to the server via a network. In one implementation, the server may, after receiving permission or a payment from the member, add the new audio file(s) to the first set of audio files associated with the member. After block 370, the process 300 ends.

V. Example System for Providing an Application Programming Interface for Interfacing with Audio Files Within a Social Network FIG. 4 conceptually illustrates an electronic system 400 with which some implementations of the subject technology are implemented. For example, one or more of the database 102, the client computing device 104, or the server 106 may be implemented using the arrangement of the electronic system 400. The electronic system 400 can be a computer (e.g., a mobile phone, PDA), or any other sort of electronic device. Such an electronic system includes various types of computer readable media and interfaces for various other types of computer readable media. Electronic system 400 includes a bus 405, processing unit(s) 410, a system memory 415, a read-only memory 420, a permanent storage device 425, an input device interface 430, an output device interface 435, and a network interface 440.

The bus 405 collectively represents all system, peripheral, and chipset buses that communicatively connect the numerous internal devices of the electronic system 400. For instance, the bus 405 communicatively connects the processing unit(s) 410 with the read-only memory 420, the system memory 415, and the permanent storage device 425.

From these various memory units, the processing unit(s) 410 retrieves instructions to execute and data to process in order to execute the processes of the subject technology. The processing unit(s) can be a single processor or a multi-core processor in different implementations.

The read-only-memory (ROM) 420 stores static data and instructions that are needed by the processing unit(s) 410 and other modules of the electronic system. The permanent storage device 425, on the other hand, is a read-and-write memory device. This device is a non-volatile memory unit that stores instructions and data even when the electronic system 400 is off. Some implementations of the subject technology use a mass-storage device (for example a magnetic or optical disk and its corresponding disk drive) as the permanent storage device 425.

Other implementations use a removable storage device (for example a floppy disk, flash drive, and its corresponding disk drive) as the permanent storage device 425. Like the permanent storage device 425, the system memory 415 is a read-and-write memory device. However, unlike storage device 425, the system memory 415 is a volatile read-and-write memory, such a random access memory. The system memory 415 stores some of the instructions and data that the processor needs at runtime. In some implementations, the processes of the subject technology are stored in the system memory 415, the permanent storage device 425, or the read-only memory 420. For example, the various memory units include instructions for providing an application programming interface for interfacing with audio files within a social network or for recommending a new audio file to a member of a social network in accordance with some implementations. From these various memory units, the processing unit(s) 410 retrieves instructions to execute and data to process in order to execute the processes of some implementations.

The bus 405 also connects to the input and output device interfaces 430 and 435. The input device interface 430 enables the user to communicate information and select commands to the electronic system. Input devices used with input device interface 430 include, for example, alphanumeric keyboards and pointing devices (also called "cursor control devices"). Output device interfaces 435 enables, for example, the display of images generated by the electronic system 400. Output devices used with output device interface 435 include, for example, printers and display devices, for example cathode ray tubes (CRT) or liquid crystal displays (LCD). Some implementations include devices for example a touchscreen that functions as both input and output devices.

Figure 4:
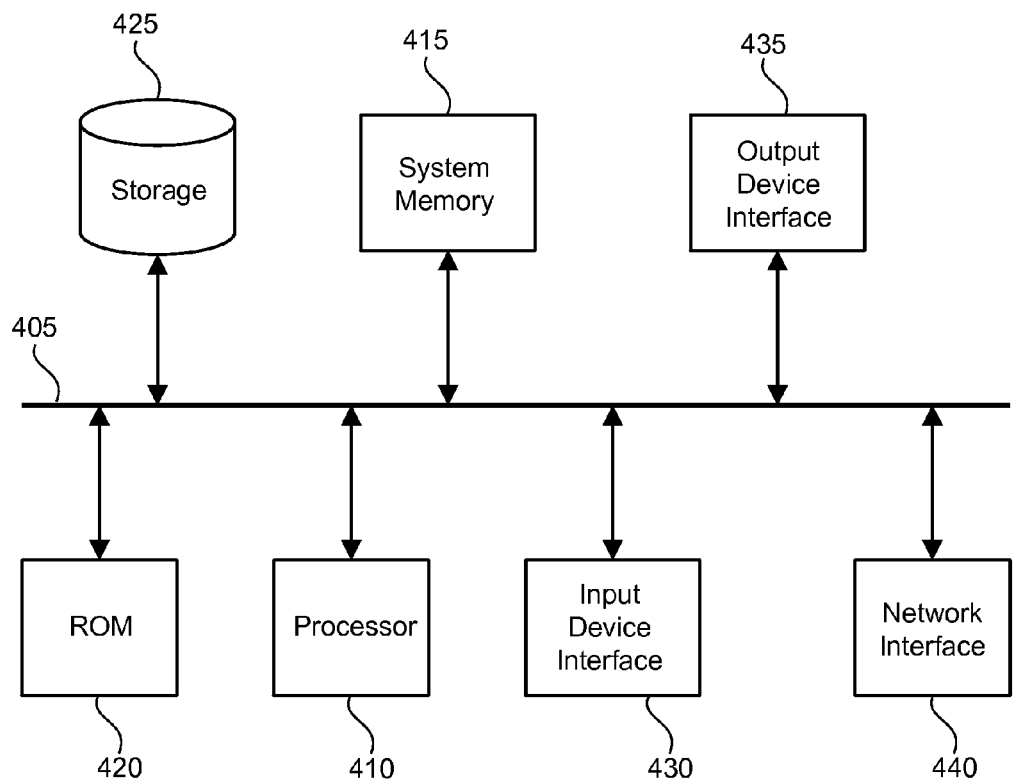
FIG. 4 conceptually illustrates an example electronic system with which some implementations of the subject technology are implemented.

Finally, as shown in FIG. 4, bus 405 also couples electronic system 400 to a network (not shown) through a network interface 440. In this manner, the electronic system 400 can be a part of a network of computers (for example a local area network ("LAN"), a wide area network ("WAN"), or an Intranet, or a network of networks, for example the Internet. Any or all components of electronic system 400 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A method executed on one or more computing devices for providing an application programming interface for interfacing with audio files within a social networking service, the method comprising:

receiving, at the one or more computing devices, an ordered list of social networking contacts associated with a member of the social networking service, wherein the ordered list of social networking contacts is arranged according to a ranking of the social networking contacts;

receiving an ordered list of audio files associated with the member of the social networking service, wherein the ordered list of audio files is arranged according to a ranking of the audio files;

receiving a set of instructions, wherein the set of instructions is configured to be implemented with the ordered list of social networking contacts and the ordered list of audio files; and interfacing with the ordered list of social networking contacts or the ordered list of audio files according to the set of instructions to modify the ordered list of audio files, wherein the ranking of the ordered list of social networking contacts associated with the member is based on a comparison of audio listening habits between the social networking contacts and the member, the audio listening habits comprising a type of activity performed while listening to a particular audio file, and wherein the ranking of the ordered list of audio files is based on one or more characteristics of individuals providing vocal input in the audio files.

2. The method of claim 1, further comprising providing for display one or more text items or one or more image items associated with one or more audio files referenced by the modified list of audio files.

3. The method of claim 1, further comprising providing for playing one or more audio files referenced by the modified list of audio files.

4. The method of claim 1, wherein the set of instructions includes instructions to remove an audio file from the ordered list of audio files.

5. The method of claim 1, wherein the set of instructions includes instructions to add an audio file to the ordered list of audio files at a specified position in the ordered list of audio files.

6. The method of claim 1, wherein the set of instructions includes instructions to provide a subset of the ordered list of social networking contacts including contacts listening to a specified audio file.

7. The method of claim 1, wherein the set of instructions includes instructions to provide a subset of the ordered list of social networking contacts including contacts recommending a specified audio file.

8. The method of claim 1, wherein the set of instructions includes instructions to associate each audio file in a subset of the ordered list of audio files with a characteristic.

9. The method of claim 1, wherein the set of instructions includes instructions to create a new list of audio files based on audio files referenced by the ordered list of audio files that are associated with a specific characteristic.

10. The method of claim 1, wherein the set of instructions includes instructions to determine a taste for a specific characteristic of the member of the social networking service based on audio files referenced by the ordered list of audio files that are associated with the specific characteristic.

11. The method of claim 1, wherein the interfacing with the ordered list of audio files comprises playing one or more audio files referenced by the ordered list of audio files via an audio player.

12. The method of claim 1, wherein the ordered list of social networking contacts comprise one or more preset groups of the social networking contacts associated with the member.

13. The method of claim 1, wherein the ordered list of social networking contacts associated with the member comprises users of the social networking service having at least one personal characteristic common to that of the member.

14. The method of claim 13, wherein the at least one personal characteristic includes one or more of an age range, a profession, a geographic location, a current or former educational institution attended, a current or former employer, a hobby, or an athletic endeavor.

15. The method of claim 1, wherein the ranking of the ordered list of social networking contacts associated with the member is based on one or more of a closeness or a similarity of the social networking contacts to the member.

16. The method of claim 1, wherein the ranking of the ordered list of social networking contacts associated with the member is based on a closeness or a similarity of a taste in audio files of the social networking contacts to a taste in audio files of the member.

17. The method of claim 1, wherein the ranking of the ordered list of audio files is further based on one or more of a preference for the audio files of the member and one or more topics associated with the audio files in the ordered list of audio files.

18. The method of claim 17, wherein text metadata of an audio file within the ordered list of audio files comprises one or more of a title of the audio file, a title of a playlist associated with the audio file, or a name of a speaker in the audio file.

19. A machine-readable medium for providing an application programming interface for interfacing with audio files within a social networking service, the machine-readable medium comprising instructions stored therein, which when executed by one or more computing devices, cause the one or more computing devices to perform operations comprising:

receiving an ordered list of social networking contacts associated with a member of the social networking service, wherein the ordered list of social networking contacts is arranged according to a ranking of the social networking contacts;

receiving an ordered list of audio files associated with the member of the social networking service, wherein the ordered list of audio files is arranged according to a ranking of the audio files associated with the member;

receiving a set of instructions, wherein the set of instructions is configured to be implemented with the ordered list of social networking contacts and the ordered list of audio files; and interfacing with ordered the list of social networking contacts or the ordered list of audio files according to the set of instructions to modify the ordered list of audio files, wherein the ranking of the ordered list of social networking contacts associated with the member is based on a comparison of audio listening habits between the social networking contacts and the member, the audio listening habits comprising a type of activity performed while listening to a particular audio file, and wherein the ranking of the ordered list of audio files is based on one or more characteristics of individuals providing vocal input in the audio files.

20. The machine-readable medium of claim 19, wherein the ordered list of social networking contacts comprises one or more preset groups of the social networking contacts associated with the member.

21. A system for providing an application programming interface for interfacing with audio files within a social networking service, the system comprising:

one or more processors; and a memory comprising instructions stored therein, which when executed by the one or more processors, cause the one or more processors to perform operations comprising:

receiving an ordered list of social networking contacts associated with a member of the social networking service, wherein the ordered list of social networking contacts is arranged according to a ranking of the social networking contacts;

receiving an ordered list of audio files associated with the member of the social networking service, wherein the ordered list of audio files is arranged according to a ranking of the audio files;

receiving a set of instructions, wherein the set of instructions is configured to be implemented with the ordered list of social networking contacts and the list of audio files; and interfacing with the list of social networking contacts or the ordered list of audio files according to the set of instructions to modify the list of audio files, wherein the ranking of the ordered list of social networking contacts associated with the member is based on a comparison of audio listening habits between the social networking contacts and the member, the audio listening habits comprising a type of activity performed while listening to a particular audio file, and wherein the ranking of the ordered list of audio files is based on one or more characteristics of individuals providing vocal input in the audio files.

22. The system of claim 21, wherein the ordered list of social networking contacts comprises an ordered list of social networking contacts.

23. The system of claim 21, wherein the ranking of the social networking contacts is based on one or more of a closeness or a similarity of the social networking contacts to the member.

24. The system of claim 21, wherein the ranking of the social networking contacts is based on a closeness or a similarity of a taste in audio files of the social networking contacts to a taste in audio files of the member.

25. The method of claim 1, wherein the type of activity comprises exercising, driving or working.

26. The method of claim 1, wherein the audio listening habits further comprise a frequency of listening to the particular audio file.

27. The method of claim 1, wherein the audio listening habits further comprise a time of day for listening to audio content.

28. The method of claim 1, wherein the ranking of the social networking contacts is further based on interactions between the member and each of the social networking contacts.

* * * * *

UNITED STATES PATENT AND TRADEMARK OFFICE
CERTIFICATE OF CORRECTION

PATENT NO. : 9,292,878 B1
APPLICATION NO. : 13/350713
DATED : March 22, 2016
INVENTOR(S) : Richard Gossweiler et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 454 days.

This patent is subject to a terminal disclaimer.

Signed and Sealed this
Second Day of August, 2016

Michelle K. Lee
*Director of the United States Patent and Trademark Office*